US012681797B2

(12) United States Patent
Kappla et al.

(10) Patent No.: US 12,681,797 B2
(45) Date of Patent: Jul. 14, 2026

(54) HANDLING FAILURE OF NETWORK FUNCTION INSTANCES IN A NETWORK FUNCTION SET

(71) Applicant: Microsoft Technology Licensing, LLC, Redmond, WA (US)

(72) Inventors: Srinivas Kappla, Nashua, NH (US); Dhananjaya Reddy Eadala, Acton, MA (US); Sreenivas Reddy Komati Reddy, Acton, MA (US); Srikiran Kalakonda, Leander, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/593,728

(22) Filed: Mar. 1, 2024

(65) Prior Publication Data

US 2025/0278328 A1     Sep. 4, 2025

(51) Int. Cl.
*G06F 11/00*          (2006.01)
*G06F 11/07*          (2006.01)
*G06F 11/20*          (2006.01)

(52) U.S. Cl.
CPC ...... *G06F 11/0793* (2013.01); *G06F 11/0709* (2013.01); *G06F 11/079* (2013.01); *G06F 11/2023* (2013.01); *G06F 11/0742* (2013.01)

(58) Field of Classification Search
CPC ............. G06F 11/0709; G06F 11/0742; G06F 11/0793; G06F 11/079; G06F 11/2023
See application file for complete search history.

(56) References Cited

U.S. PATENT DOCUMENTS

| | | | |
|---|---|---|---|
| 8,095,935 B2 * | 1/2012 | Paramasivam ....... | G06F 9/5033 718/105 |
| 9,003,191 B2 * | 4/2015 | Soulios ................... | H04L 63/08 713/168 |
| 2009/0109896 A1 * | 4/2009 | Rashid .................. | H04W 76/18 370/320 |

(Continued)

FOREIGN PATENT DOCUMENTS

| | | | | |
|---|---|---|---|---|
| EP | | 2273759 B1 * | 3/2012 | ........... H04L 67/104 |

*Primary Examiner* — Elmira Mehrmanesh
(74) *Attorney, Agent, or Firm* — Ray Quinney & Nebeker P.C.; James S. Bullough

(57) ABSTRACT

The present disclosure relates to systems, methods, and computer-readable media for recovering from a failure of a network function instance from a network function set within a telecommunications network. The systems described herein involve a peer network function that obtains profile information including a hashing algorithm associated with handling a failure condition. The peer network function additionally maintains a session identifier corresponding to a session between the peer network function and the network function instance. In response to the network function instance failing, the peer network function can implement the hashing algorithm to determine which of a plurality of additional network function instances from the network function set should be used to re-establish the session. The hashing algorithm includes attributes that ensure consistent selection between peer network functions as well as balancing network traffic between network function instances of the network function set.

19 Claims, 6 Drawing Sheets

(56) References Cited

U.S. PATENT DOCUMENTS

| | | | |
|---|---|---|---|
| 2016/0066189 A1* | 3/2016 | Mahaffey | H04W 12/12 |
| | | | 455/405 |
| 2019/0045421 A1* | 2/2019 | Shah | H04W 40/02 |
| 2020/0084269 A1* | 3/2020 | Husar | H04L 45/02 |
| 2022/0117015 A1* | 4/2022 | DeFoy | H04W 76/11 |
| 2023/0006889 A1* | 1/2023 | Thyagaturu | H04L 41/5054 |
| 2024/0147231 A1* | 5/2024 | Shen | H04W 12/06 |
| 2024/0284268 A1* | 8/2024 | Qian | H04W 36/00222 |

* cited by examiner

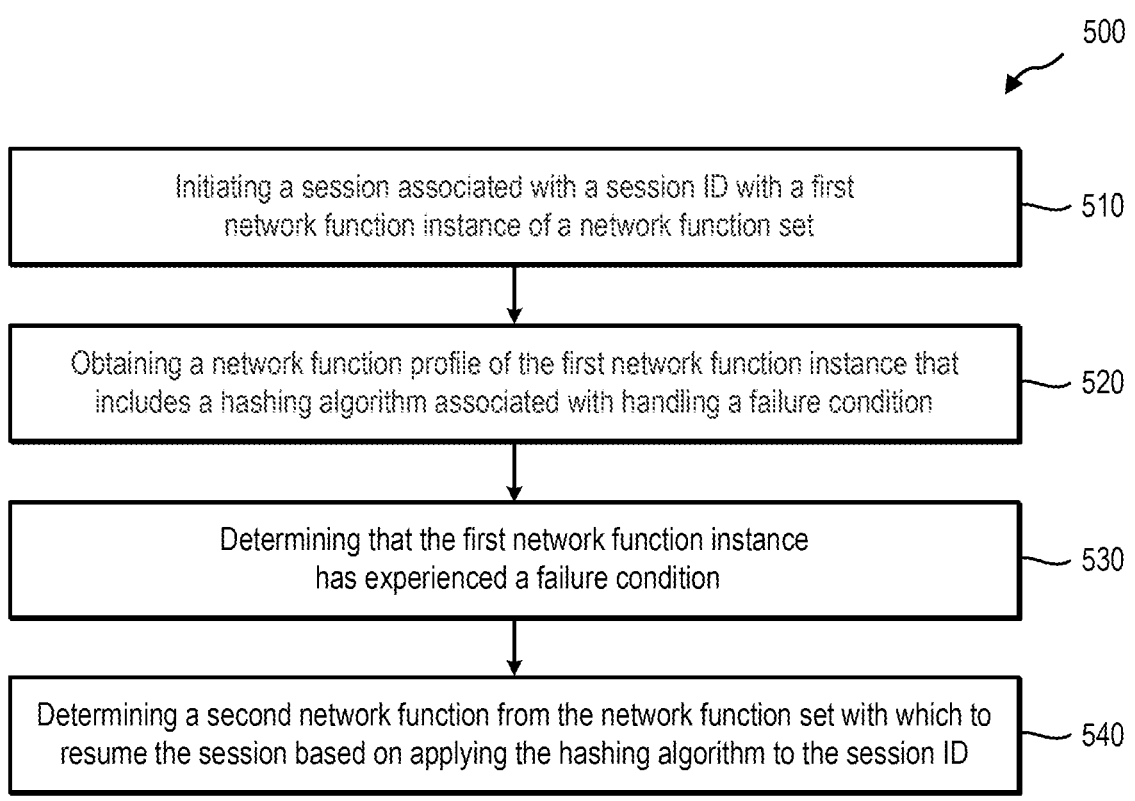

500

Initiating a session associated with a session ID with a first
network function instance of a network function set    510

Obtaining a network function profile of the first network function instance that
includes a hashing algorithm associated with handling a failure condition    520

Determining that the first network function instance
has experienced a failure condition    530

Determining a second network function from the network function set with which to
resume the session based on applying the hashing algorithm to the session ID    540

Memory _603_

Instructions _605_

Data _607_

Processor _601_

Communication Interface(s) _609_

Input Device(s) _611_

Output Device(s) _613_

Display Device _615_

Display Controller _617_

619

HANDLING FAILURE OF NETWORK FUNCTION INSTANCES IN A NETWORK FUNCTION SET

BACKGROUND

Cellular networks can provide computing devices (e.g., mobile devices) with access to services available from one or more data networks. A cellular network is typically distributed over geographical areas that often include base stations, core networks, and/or edge networks that collectively provide a variety of services and coverage to end-user devices (e.g., mobile devices). The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN), an edge network, and a core network. In many instances, the RAN may include base stations having components thereon that communicate wirelessly with user devices (e.g., mobile devices or other endpoints) and facilitate interaction with other components of a core network and/or cloud computing system. In addition, the core network may include a variety of functions and nodes that provide services to a client.

In recent years, cellular networks have provided a variety of functions that enhance capabilities of services provided to end-users. For example, many core networks provide network functions of a variety of different types that provide different services to users of the cellular network. To ensure that network functions provide ready availability to associated services, many core networks include groupings of network functions in which each instance of the grouping of network functions can provide similar services, such as in the event that a specific instance of a network function goes down. As defined in current telecommunication standards, however, problems arise when a particular network function goes down that may be in communication with multiple device and/or is providing services in conjunction with a large number of communication sessions. Solutions to these problems are not currently addressed in conventional telecommunication standards (e.g., 3GPP standards).

These and other problems exist in connection with handling failure of network function instances within telecommunications networks.

BRIEF DESCRIPTION OF THE DRAWINGS

FIG. 5 illustrates a series of act related to handling a failure of a network function instance from a network function set in accordance with one or more embodiments.

DETAILED DESCRIPTION

Figure 1:
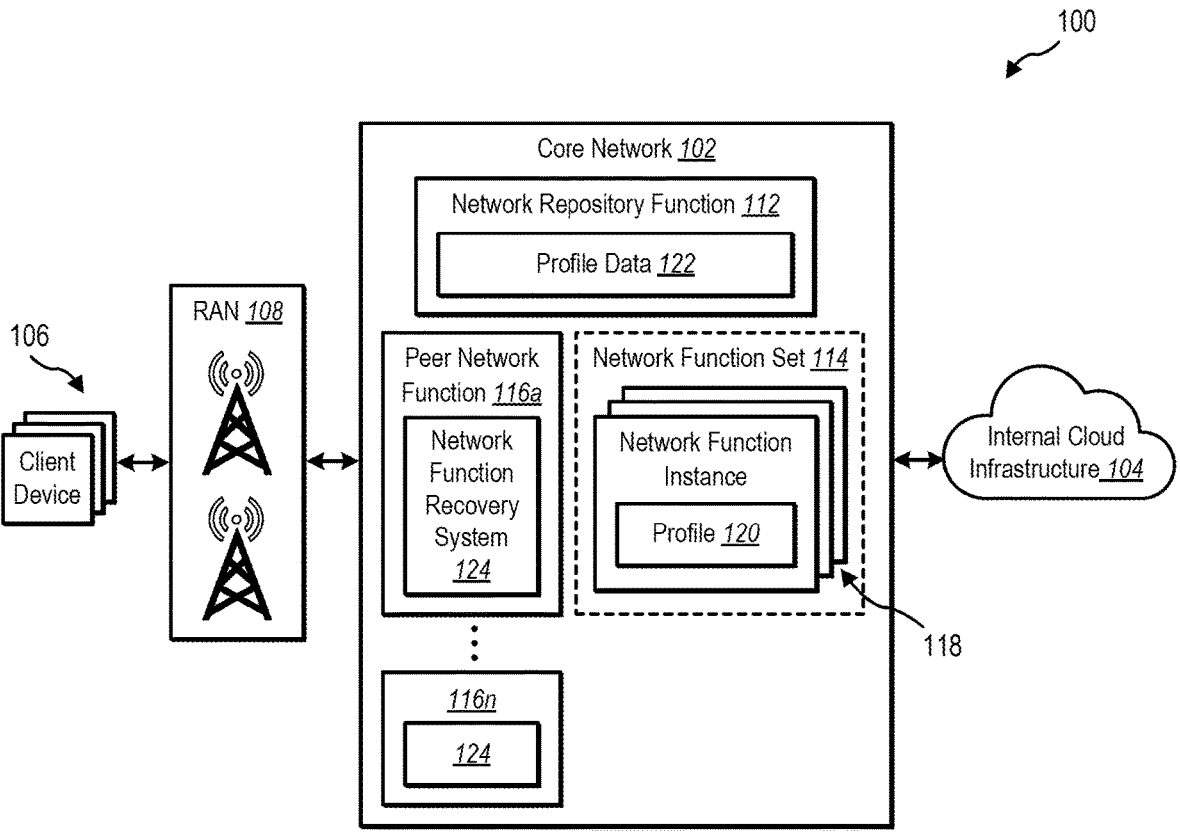
FIG. 1 illustrates an example environment including a core network in which peer network functions can handle failure of network function within a network function set in accordance with one or more embodiments.

The present disclosure relates generally to systems, methods, and computer readable media for handling failure of network function instances within network function sets. In particular, as will be discussed in further detail below, the present disclosure involves implementations in which a peer network function engaged in a communication session (or simply "session") with a network function instance determines that the network function instance has experienced a failure condition (e.g., has gone down) and performs features and functionality related to maintaining or resuming the session with one or more additional network function instances of a related network function set. The present disclosure described features and functionality in which any number of peer network functions can resume a session previously initiated with the down network function instance while also balancing a load between additional network functions of the network function set.

As an illustrative example, a peer network function and a first network function instance may initiate a session being associated with a session identifier where the first network function is part of a network function set including a plurality of network function instances. The peer network function may additionally obtain a network profile for the first network function instance where the network profile includes a consistent hashing algorithm associated with handling one or more failure conditions of the first network function instance. Upon determining that the first network function instance has experienced the failure condition (e.g., based on failure of communicating or confirming a session modify request between the peer network function and the first network function instance, the network function instance may determine a second network function instance from the network function set with which to continue the session. In one or more implementations, the peer network function determines or otherwise selects the second network function instance based on applying the consistent hashing algorithm to the session identifier.

As will be discussed herein, the present disclosure includes a number of practical applications having features described herein that provide benefits and/or solve problems associated with recovering from a failure of a network function instance. As will be discussed below, the network functions can recover from the failure of the network function instance in a manner that enables one or more peer network functions to resume communication with a network function instance in conjunction with the same session that was previously initiated between the peer network function and the first network function instance.

For example, by implementing a network function profile that includes a consistent hashing algorithm, a network function recovery system on a peer network can consistently select one of a plurality of additional network function instances of a given network function set. In contrast to conventional systems in which individual network functions have local policies that differ between respective network functions, the distribution of a consistent hashing algorithm enables each of multiple peer network functions to reliably select the same network function instance with which to resume a session.

By using the consistent hashing algorithm rather than a local policy in determining a new network function instance from a network function set, multiple peer network functions in communication with a failed network function instance can consistently identify a same network function instance when recovering from the network function instance failure. For example, where a network function instance is an SMF in communication with a first peer network function (e.g., an access and mobility management function (AMF)) and a second peer network function (e.g., a policy control function (PCF)), both the first and second peer network functions can identify the same (second) network function instance from the network function set. This is in contrast to conventional approaches in which each of the respective peer network functions may implement different local policies that result in inconsistent selection between network function instances from the network function set.

In addition to ensuring consistent selection of network function instances when recovering from a failed network function instance, features of the network function recovery system may additionally ensure that selection of network function instances are balanced between network function instances from a given network function set. For example, where a first network function instance that goes down is hosting or otherwise servicing a significant number of sessions associated with respective session identifiers, the consistent hashing algorithm includes attributes or characteristics that, when applied to different session identifiers, will result in a balanced selection between remaining network function instance identifiers of the network function set. Indeed, in contrast to local policies which may cause traffic associated with all sessions serviced by the down network function instance to be offloaded to a single network function, the consistent hashing algorithm includes values and characteristics that ensure an even or near-even balance between network function instances of the network function set when selecting which of the network function instances to use in resuming sessions previously hosted by the down network function instance.

In addition, by distributing network function profile data including a consistent hashing algorithm to any number of network functions in communication with a network function instance, each of the network functions are enables to locally determine which of the network function instances from the network function set should be used in recovering from the failed network function instance. This enables a network function repository, such as a network repository function (NRF) to store and provide access to profile data without requiring that the NRF also store session data. This provides scalability of the network function recovery system as well as additional security of profile and session data in enabling peer network functions to determine or otherwise identify which of a plurality of network function instances should be used in recovering from a failed network function instance.

The above-benefits are applicable to any number and variety of network functions. For example, the above-benefits may be implemented on any number and variety of peer network functions in facilitating recovery of sessions between the peer network functions and any network function instance of a given network function set. In addition, the above-benefits may be implemented in connection with any type of network function set in which multiple instances of network functions may be associated or grouped together according to applicable telecommunication standards.

As illustrated in the foregoing discussion and as will be discussed in further detail herein, the present disclosure utilizes a variety of terms to describe features and advantages of methods and systems described herein. Some of these terms will be discussed in further detail below.

As used herein, a "cloud computing system" or "distributed computing system" may be used interchangeable to refer to a network of connected computing devices that provide various services to computing devices (e.g., customer devices). For instance, as mentioned above, a cloud computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. In one or more embodiments a data network may be implemented on the same or on a different cloud computing network as the portion of the cellular network.

As used herein "network function" may refer to an entity in a communication environment (e.g., a telecommunication network) that is configured to perform a task within the communication environment. For example, a network function may refer to an application or service provided a cloud computing system that handles a respective component of a telecommunications network, such as authentication, mobility management, routing, steering traffic, charging traffic, managing policies, providing access to storage volumes, etc. Examples of network functions include, but are not limited to session management functions (SMFs), access and mobility management functions (AMFs), network exposure functions (NEF), management functions (MFs), user plane functions (UPFs), policy control function (PCF), and charging functions (CHF). Indeed, a network function may refer to any function or entity in a communication environment (e.g., 5G or beyond cellular environment) that handles a respective component of feature of a telecommunications network. While one or more embodiments described herein relate specifically to network functions within a 5G telecommunications framework, features described in connection with 5G-specific functions may similarly apply to other generations of 3GPP or other telecommunications network frameworks.

As used herein, a "network function set" refers to a grouping or set of network functions of a similar network function type. For example, a network function set may refer to a grouping of identical or similar network function instances that are capable of performing similar functions and/or providing similar services on the telecommunications network. In one or more embodiments, a network function set refers to an SMF set including multiple instances of SMFs that are grouped based on geography, configurations, or other similarities that enable the SMFs to provide service to corresponding network functions on the telecommunications network. In addition to referring to network functions of similar types, the network functions of a common network function set share access to session information between the instances of the network function set. In this manner, when one network function instance goes down, any of a number of additional network function instances can resume a session with other peer network functions with which the failed network function instance was previously engaged.

As used herein, a "network function instance" refers to an instance of a network function set that provides redundancy between the plurality of network function instances of the network function set. Indeed, each network function instance may have access to similar session information that enables each of the network function instances to cover for one another in the event that one or more of the network function instances goes down. In one or more embodiments described herein a network function set includes at least three or more network function instances.

As used herein, a "peer network function" refers to a network function that is in communication with or with which a network function has established a session. For example, where a network function instance refers to an SMF instance from an SMF-type set of multiple SMF instances, a peer network function may refer to any network function that communicates with or engages with the SMF instance for a session and in conjunction with a particular session identifier. It will be appreciated that all of the peer network functions in communication with a network function instance for a given session will share a common session identifier. This session identifier will be determined, assigned, or otherwise distributed to the peer network functions at a time when the session is established with the network function instance.

It will be appreciated that peer network functions and network function instances may refer to the same network function depending on their role in a given embodiment. For example, as used herein a network function instance refers to a network function instance of a given network function set while a peer network function refers to any network function to the network function set that engages with or communicates with the network function instance for a given session. In this example, the network function instance may be a peer network function with respect to a different network function that is part of a different network function set. Thus, the specific terms of peer network function and network function instance simply refer to network functions that are part of or external to a network function set in connection with a particular embodiment.

As used herein a "network function profile" refers to a set of data that may be used to identify a given network function. A network function identifier may include, for example, a unique identifier of a given network function instance within a network function set. A network function profile may include additional information that enables another network function (e.g., a peer network function) to communicate with the network function instance associated with the network function profile. In one or more embodiments described herein a network function profile additionally include a failure handling algorithm, referred to herein as a hashing algorithm (or consistent hashing algorithm), which may be used in connection with one or more embodiments described herein to recover from a network function instance experiencing a failure condition. In one or more embodiments, the network function profile is a network function profile as defined by 3GPP standards.

As used herein, a "failure handling algorithm", "hashing algorithm", or "consistent hashing algorithm" refer interchangeably to an algorithm that may be used in determining which of a plurality of network function instances may be used in recovering from a failure condition of a network function instance. As will be discussed in further detail below, a hashing algorithm may refer to a number of buckets or ranges of values that are associated with network function instances such that applying the hashing algorithm to a session identifier enables a network function to consistently determine which of a plurality of network function instances should be used to handle recovery of a session in the event a network function instance previously servicing the session goes down or otherwise experiences a failure condition. While one or more embodiments described herein refer specifically to a hashing algorithm, it will be understood that the hashing algorithm may be considered a consistent hashing algorithm in which different network functions that apply the hashing algorithm to a similar identifier value will determine a consistent output.

The hashing algorithm may refer to a variety of different failure handling algorithms or attributes of a network function profile. For example, in one or more embodiments, the hashing algorithm refers to an extremely fast non-cryptographic hash algorithm (e.g., algorithm: "xxHash64", Slots: 1024) that is a part of a network function profile for a corresponding network function instance. Indeed, by way of example and not limitation, the hashing algorithm may refer to a variety of algorithms, including xxHash64, a murmur32 hash, an MD5 hash, or a crc32 hash.

Additional detail will now be provided regarding systems described herein in relation to illustrative figures portraying example implementations. For example, FIG. 1 illustrates an example environment 100 for implementing features and functionality of a network function recovery system in accordance with examples described herein.

As shown in FIG. 1, the environment 100 may illustrate portions of a communication environment (e.g., a cellular network, such as a 5G cellular network). For example, the environment 100 may include zones or components of a cloud computing system, such as a core network 102 and an internal cloud infrastructure 104. The environment 100 may additionally include a plurality of client devices 106 and a radio access network (RAN) 108 (or simply RAN 108). These components 102-108 may collectively form a public or private cellular network, which includes a RAN, core network, and a data network. Moreover, any portion(s) of the cellular network may be implemented on a cloud computing system inclusive of the core network 102 and the internal cloud infrastructure 104 (e.g., a cloud datacenter). In one or more embodiments, components of the core network 102 and/or RAN 108 may be implemented using virtualized components as part of an edge network or other decentralized infrastructure in which computing nodes of a cloud computing system are physically implemented at locations that are in proximate to or otherwise within closer vicinity of the client devices 106 than other components of the cloud computing system (e.g., the internal cloud infrastructure 104).

The client device(s) 106 may refer to a variety of computing devices or device endpoints including, by way of example, a mobile device such as a mobile telephone, a smartphone, a personal digital assistant (PDA), a tablet, or a laptop. Alternatively, one or more of the client devices 106 may refer to non-mobile devices such as a desktop computer, a server device (e.g., an edge network server), or other non-portable devices. In one or more embodiments, the client devices 106 refer more generally to any endpoint capable of communicating with devices on a cloud computing system (e.g., a cloud computing system hosting the cellular network), such as Internet of Things (IoT) devices, or other Internet-enabled devices. In one or more embodiments, the client devices 108 refer to applications or software constructs on corresponding computing devices.

As shown in FIG. 1, a radio access network (RAN) 108 (or simply, "RAN 108") is positioned between the client devices 106 and a core network 102. The RAN 108 may include a plurality of RAN sites. In one or more embodiments, each RAN site includes one or more base stations and associated RAN components. While the RAN 108 may include components that are entirely separate from the core network 102, one or more embodiments of the environment 100 include one or more RAN components or services traditionally offered by a RAN site that are implemented as virtualized components on a cloud computing system (e.g., as part of the core network 102). Indeed, as communication networks become more complex and further decentralized, one or more components of the RAN 108 may be implemented as virtualized components hosted by server nodes and general-purpose computing devices of a cloud computing system. Components of the RAN 108 may be implemented on devices of an edge network, the core network 102, and/or on datacenters of the internal cloud infrastructure 104 (or across a combination of the above-cloud computing zones). In one or more embodiments described herein, the various network functions may refer to not only those functions that are serviced as part of the core network 102, but as one or more virtualized RAN components implemented as a service or otherwise hosted on a cloud computing system.

As shown in FIG. 1, the core network 102 includes a network repository function 112. As used herein, the network repository function 112 refers to a network function on the core network 102 that maintains a repository or register or a collection of network functions on the cloud computing system (e.g., on the core network 102 of the cloud computing system). In one or more embodiments, the network repository function 112 is a network function as defined by 4G, 5G, 6G, or other 3GPP standards. In other implementations, the network repository function 112 refers to a service or feature associated with storing, maintaining, and/or providing access to profile data as defined by any telecommunications network standard.

As shown in FIG. 1, the network repository function 112 includes profile data 122 stored or otherwise maintained thereon. The network repository function 112 may refer to a single network function that maintains profile data 122 associated with any number of network functions on the core network 102. Alternatively, the network repository function 112 may refer to a functionality spread across multiple network functions (including different types of network functions) in which profile data 122 is maintained and accessible to network functions on the core network 102. As will be discussed in further detail below, the network repository function 112 may provide access to profile data 122 including hashing algorithms that may be used by network functions in handling failure conditions of one or more network functions.

As further shown, the core network 102 includes a plurality of network functions having different designations as may serve particular embodiments. As discussed above, the network functions may refer to peer-network functions 116a-n and/or network function instances 118 of an associated network functions 114. Each of the network functions may include profiles made up from profile data stored or otherwise maintained by the network repository function 112. In addition, each of the network function instances from the network function set 114 share access to session information and other information that enables any of the network function instances from the network function set 114 to resume sessions with other peer network functions with which the other network function instances are previously or currently engaged.

As shown in FIG. 1, the network functions includes a plurality of peer network functions 116a-n. While not shown in FIG. 1, each of the peer network functions 116a-n may include a network function profile maintained on the network repository function 112. As shown in FIG. 1, a first peer network functions 116a includes a network function recovery system 124 implemented thereon. Each of the peer network functions 116a-n may similarly include a network function recovery system 124 implemented thereon.

As shown in FIG. 1, the network functions further include a network function set 114. The network function set 114 includes a plurality of network function instances 118 having associated network function profiles 120. The network function set 114 may include any number of network function instances 118. In one or more embodiments, the network function set 114 includes at least three network function instances 118.

As noted above, and as will be discussed in further detail below, the network function set refers to a grouping or set of network functions of a similar or identical network function type. For example, in one or more embodiments described herein, a network function set refers to a plurality of SMF instances that are grouped in accordance with some criteria or characteristic, such as a geographic grouping of SMF instances. Similarly, the peer network functions may refer to network functions that are in communication with one or more network function instances of a particular network function set. In contrast to the network functions instances of a network function set, the peer network functions may refer to one or more as well as a variety of network functions that are in communication with the specific type of network function instance(s). For example, in one or more embodiments described herein, peer network functions refer to one or more of AMFs, PCFs, CHFs, UPFs, and any other network function types that are in communication with an SMF instance of the SMF set.

Additional detail will now be discussed in connection with facilitating recovery from a failure condition of a network function instance from a network function set. In particular, FIG. 2 illustrates and example implementation involving a network function recovery system 124 implemented on a peer network function 114 that facilitates recovery of a failure condition associated with a first network function instance 118a from a network function set 118.

Figure 2:
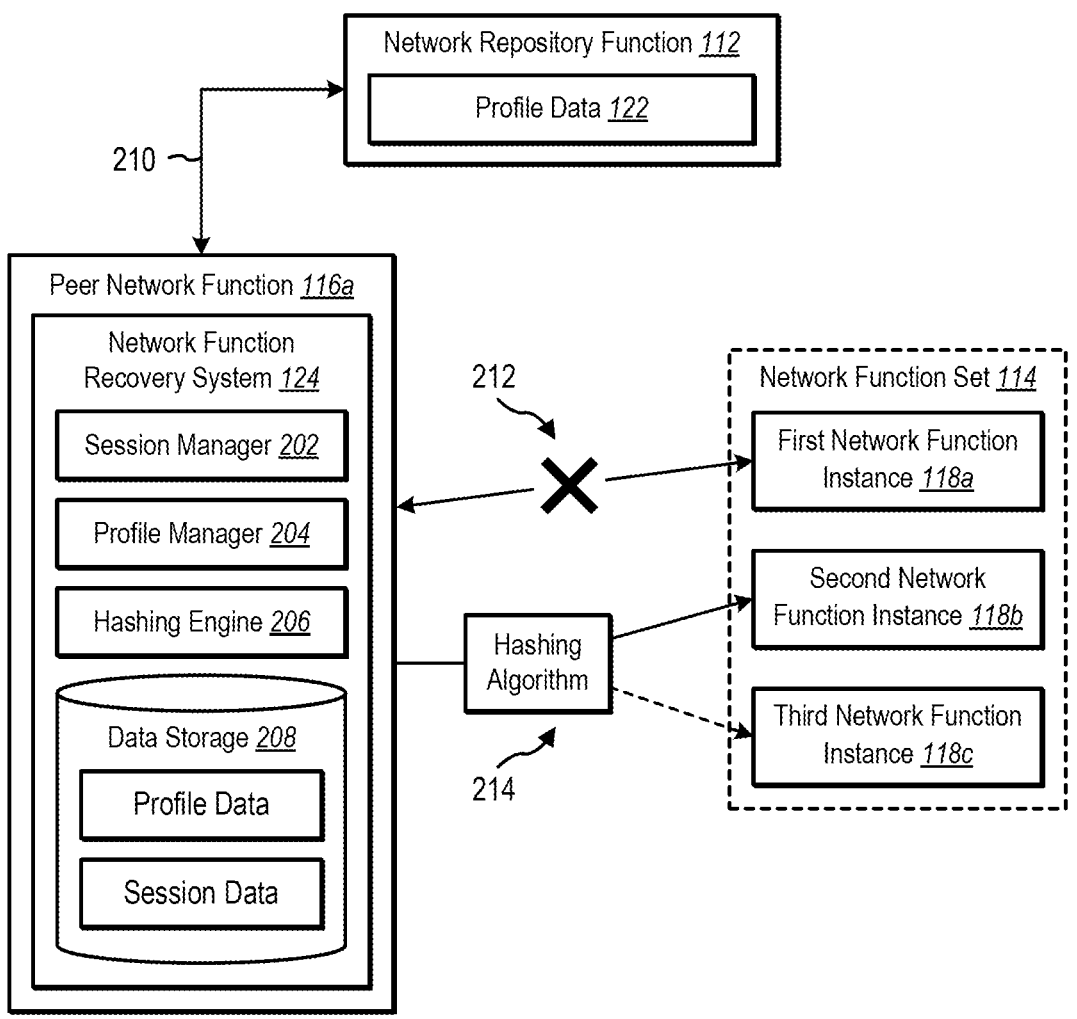
FIG. 2 illustrates an example implementation in which a peer network function handles failure of a first network function instance within a network function set in accordance with one or more embodiments.

As shown in FIG. 2, a peer network function 116 may be in communication with one of a plurality of network function instances 118a-c of a network function set 114. As further shown, the peer network function 116 includes a network function recovery system 124 implemented thereon. The network function recovery system 124 includes a session manager 202. The session manager 202 manages a session in which two endpoints are communicating via one or more network functions. In one or more embodiments described herein, a session may refer to a communication session between a client device and one or more applications hosted by the internal cloud infrastructure 104 of a cloud computing system. In this example, the session manager 202 may manage one or more features and functionality of the peer network function 116 with respect to a given session. The peer network function 116 may be involved with any number of sessions between any number of endpoints.

In one or more embodiments, each session is associated with a session identifier. The session manager 202 may determine a session identifier or receive a session identifier (e.g., from an SMF) when the peer network function 116 joins a corresponding session. In one or more embodiments, the session manger 202 obtains a copy of the session identifier when the peer network function 116 initiates the session (e.g., engages with a new or existing session) with a first network function instance 118a of the network function set 114. The session identifier may have a standard format between all sessions hosted by the cloud computing system. For example, a session identifier may refer to a string of alphanumeric characters that may uniquely identify a given session from among all sessions hosted by the cloud computing system (e.g., a mobile network hosted by the cloud computing system). In one or more embodiments, any network function that is a participant in a given session will receive or otherwise obtain the same session identifier for the given session. Thus, each of multiple peer network functions in communication with the first network function instance in conjunction with a given session will obtain an identical or similar copy of the session identifier for the given session.

In one or more embodiments, a value of the session identifier is determined or otherwise selected to ensure a load balanced distribution in which the network function recovery system 124 selects one of the additional non-failed network function instances 118*b-c*. For example, in one or more embodiments, when assigning or initially selecting a session identifier, one or more of the peer network function 116*a* and/or first network function instance 118*a* ensures that session identifiers for different sessions are distributed in a manner that ensures at least a semi-uniform distribution of session identifier values across a range of possible session identifier values. For example, in one or more embodiments, the session identifiers are selected randomly or can be uniformly distributed across a range of possible values such that applying a hashing algorithm to different session identifiers will result in a load balanced distribution between network function instances of the network function set 114 that are selected in the event that a first network function instance 118*a* goes down. Thus, in one or more embodiments, the session identifiers are selected to have values that, when the hashing algorithm is applied (in the event of a network function instance failure), facilitates an even or close-to-even distribution in which the additional network function instances of a given network function set are selected.

As further shown in FIG. 2, the network function recovery system 124 includes a profile manager 204. The profile manager 204 may maintain or otherwise manage any information associated with profile data of the peer network function and/or any additional network functions associated with a given session identifier. In one or more embodiments, the profile manager 204 obtains profile data 122 from the network repository function 112. In one or more embodiments, the profile manager 204 provides profile data of the peer network function to the network repository function 112 to maintain thereon.

In the example illustrated in FIG. 2, the network function recovery system 124 (e.g., the session manager 202) may detect a failure condition 212 of a first network function instance 118*a*. For example, the network function recovery system 124 may detect that the first network function instance 118*a* has not responded to a session request (e.g., a session modify request) or may receive a signal indicating that the first network function instance 118*a* has gone down or is no longer capable of responding to session-related requests. In either case, the network function recovery system 124 may make a determination that the first network instance 118*a* is experiencing a failure condition 212 that is preventing the peer network function 116 from otherwise engaging with the first network function instance 118*a* for a corresponding session.

In response to detecting the failure condition 212, the network function recovery system 124 (e.g., the profile manager 204) may send a request to the network repository function 112 requesting access to profile data 122 of the first network function instance 118*a*. As shown in FIG. 2, the network repository function 112 may provide a profile response 210 in which profile data 122 is provided to the peer network function 116. In one or more embodiments, the network function recovery system 124 collects the profile data pre-emptively (e.g., based on initiating or engaging with the first network function instance 118). In other examples, the network function recovery system 124 collects the profile data based on (e.g., in response to) detecting the failure condition 212.

As shown in FIG. 2, the network function recovery system 124 includes a hashing engine 206. As noted above, the profile data 122 of the first network function instance 118*a* includes a hashing algorithm 214. In the event of a failure condition, such as the failure condition 212 of the first network function instance 118*a*, the hashing engine 206 may utilize the hashing algorithm 214 to determine which of the remaining network function instances 118*b-c* to use in lieu of the failed first network function instance 118*a*. In this example, the hashing engine 206 may utilize the hashing algorithm 214 to determine which of a second network function instance 118*b* or a third network function instance 118*c* to use as a replacement for the first network function instance 118*a* and to otherwise resume the session previously established between the peer network function 116 and the first network function instance 118.

As shown in FIG. 2, the hashing engine 206 may apply the hashing algorithm 214 to a session identifier corresponding to the failed session between the peer network function 116 and the first network function instance 118*a*. Indeed, by applying the hashing algorithm 214 to the session identifier, the hashing engine 206 may determine (in this example) to use the second network function instance 118*b* rather than the third network function instance 118*c*. In one or more embodiments, the selection of the replacement network function instance is based on an output value as a result of applying the hashing algorithm 214 to the session identifier. As a non-limiting example, an output of applying the hashing algorithm to any session identifier may have a predefined range of values with each of any remaining network function instances of the network function set 114 being assigned bucket(s) or range(s) of values within the predefined range of values. In this example, the output of applying the hashing algorithm 214 to the session identifier falls within a range or bucket of values assigned to the second network function instance 118*b* and thus, the second network function instance 118*b* is selected for re-establishing the session between the peer network function 116 and the second network function instance 118*b*.

As noted above, the hashing algorithm in accordance with one or more embodiments described herein provides a number of benefits related to ensuring consistency in selecting a network function instance as well as balancing a load between remaining network function instances of the network function set 114. For example, as will be discussed below in connection with FIG. 4, because the profile for the first network function instance 118*a* includes the same hashing algorithm, and because the hashing algorithm is provided to each of the peer network function 116 and any additional peer network functions that are in communication with the first network function instance 118*a*, each of the peer network function 116 and any additional peer network functions will reliably select the same network function instance from the network function set 114 when selecting a new network function instance with which to resume the session.

In addition to ensuring consistency, the hashing algorithm additionally includes characteristics and properties that ensure a balanced selection between the remaining network function instances 116*b-c* of the network function set 114. Indeed, whether the network function set 114 includes only three network function instances or a dozen network function instances (or any additional number of three or more network function instances), the hashing algorithm includes properties that causes the peer network functions to balance their selections of different network function instances in the event that one of the network function instances goes down.

As further shown in FIG. 2, the peer network function includes a data storage 208 on which different types and varieties of data are stored or otherwise made accessible to the peer network function 116. For example, profile data may be stored on the data storage 208. The profile data may refer to any data from a profile of the peer network function 116 and any other network functions (e.g., network function instances) that are associated with a session in which the peer network function 116 is engaged. Consistent with one or more embodiments described herein, the profile data may be obtained from the network repository function 112. In addition, the profile data may refer to profile data that is shared with or otherwise provided to the network repository function 112.

As further shown, the data storage 208 may include session data stored thereon. The session data may refer to any session information associated with one or more sessions in which the peer network function 116 is engaged. For example, the session data may include any information, including a session identifier, for the session involving the peer network function 116 and the first network function instance 118*a*. The session data may include any information including session identifiers for additional sessions involving the peer network function 116 and any additional network functions.

Figure 3:
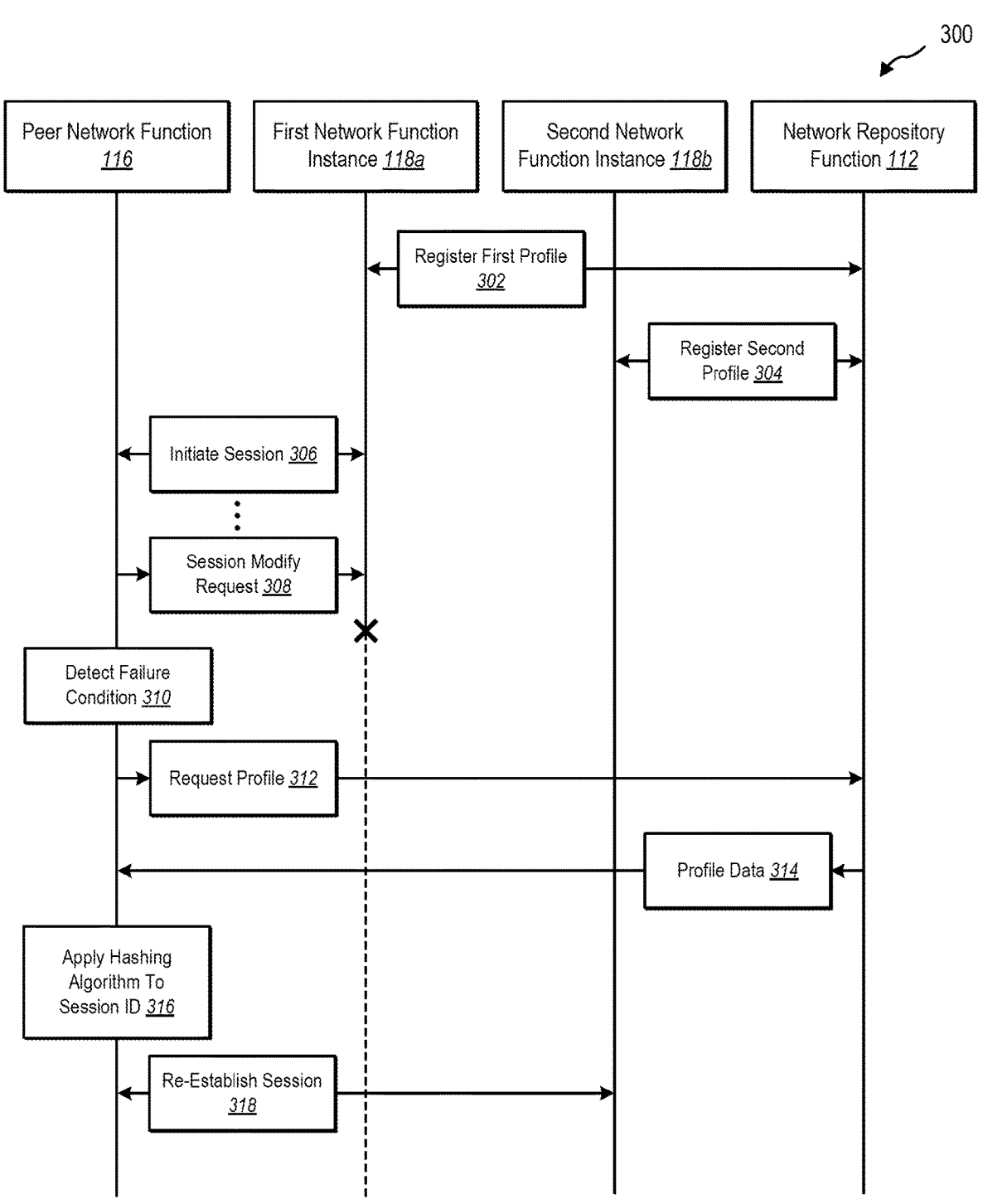
FIG. 3 illustrates an example diagram showing interactions between a peer network function, a repository function, and a network function set in handling failure of a first network function in the network function set.

FIG. 3 illustrates an example implementation of the network function recovery system 124 handling a failure condition in accordance with one or more embodiments. As shown in FIG. 3, a series of acts 300 showing interactions between a peer network function 116, a first network function instance 118*a*, a second network function instance 118*b*, and a network repository function 112 is illustrated. In this example, the peer network function 116, network function instances 118*a-b*, and network repository function 112 have similar features and functionality as similar components discussed above. In addition, while not shown in FIG. 3, the first and second network function instances 118*a-b* refer to similar types of network functions that are part of a common network function set. It will be appreciated that the peer network function 116 and network function instances 118*a-b* may refer to any of a variety of network function types in which a peer network function communicates with one of a plurality of network function instances from a common network function set.

As shown in FIG. 3, the first network function instance 118*a* and the network repository function 112 may perform an act 302 of registering a first profile. This act 302 may involve the first network function instance providing profile information to the network repository function 112 as part of the process of loading or setting up the first network function instance 118*a* on the core network 102. Indeed, in one or more embodiments, the first network function instance 118*a* provides (or receives) a network function profile when the first network function instance 118*a* is installed and/or configured within the framework of the cellular network. As noted above, the network function profile includes, among other things, a hashing algorithm in accordance with one or more embodiments described herein.

As further shown in FIG. 3, the second network function instance 118*b* and network repository function 112 may perform an act 304 of registering a second profile. This act 304 may include similar features as the act 302 of registering the first profile discussed above. For example, the second profile may be registered with the network repository function 112 at a time when the second network function instance is configured or otherwise loaded within the framework of the core network 102. Similar to the first network function profile, the second network function profile includes a hashing algorithm. It will be appreciated that the network function profile may have similarities (e.g., a similar identifier of a network function set) as well as unique differences (e.g., a different unique instance identifier and a different hashing algorithm).

As shown in FIG. 3, the peer network function 116 and the first network function instance 118*a* may perform an act 306 of initiating a session. In one or more embodiments, this involves one of the peer network function 116 or the first network function instance 118*a* sending a session create request to one another. In different embodiments, the different network functions will initiate the session creation. For example, in the event that the peer network function 116 is a peer-AMF and the first network function instance 118*a* is an SMF instance, the peer-AMF may initiate the session with the first SMF instance. Alternatively, where the peer network function 116 is a CHF or PCF, the SMF instance may be the entity that initiates the session.

As the time of establishing the session, the peer network function 116 and first network function instance 118*a* may exchange session information. For example, at the creation or initiation of the session, the respective network functions may share a session identifier that is maintained between the two network functions. As will be discussed in further detail below, one or both of the network functions engaged in the session may similarly share the session identifier and other session-related information with other network functions that are part of the session. In addition, while not shown in FIG. 3, in one or more embodiments, the peer network function 116 collects profile data from the network repository function 112 at a time when the session is created.

As shown in FIG. 3, the peer network function 116 performs an act 308 of sending a session modify request to the first network function instance 118*a*. The peer network function 116 may send any number of session requests (e.g., session modify requests) to the first network function 118*a* so long as the session is ongoing. In this example, the peer network function 116 sends a plurality of session modify requests and otherwise engaged with the first network function instance 118*a* prior to performing the act 308 of sending the session modify request shown in FIG. 3.

As shown in FIG. 3, the peer network function 116 performs an act 310 of detecting a failure condition. The peer network function 116 can detect the failure condition in a number of ways. For example, the peer network function 116 can detect the failure condition based on the session modify request failing in some manner. In one or more embodiments, peer network function 116 detects the failure condition based on the failure of the first network function instance 118*a* providing a valid response to the latest session modify request. In one or more embodiments, the peer network function 116 detects the failure condition based on receiving a notification of a failure condition from the first network function instance 118a.

As noted above, while not shown in FIG. 3, the peer network function 116 may pre-emptively collect profile data for any of the network functions with which the peer network function 116 communicates. For example, in one or more embodiments, the peer network function 116 obtains profile data including a hashing algorithm, from the network repository function 112 prior to detecting the failure condition (e.g., at a time when the session is established or otherwise initiated). Alternatively, as shown in FIG. 3, based on detecting the failure condition, the peer network function 116 may perform an act 312 of requesting a profile from the network repository function 112. In response to the request, the network repository function 112 may perform an act 314 of providing the profile data to the peer network function 116. In one or more embodiments, the network repository function 112 provides the profile data by transmitting or otherwise delivering the profile data to the peer network function 116. In one or more embodiments, the network repository function 112 simply provides access to a data store having the profile data maintained thereon.

As noted above, the profile data includes a hashing algorithm associated with the first network function instance 118a. As shown in FIG. 3, the peer network function 116 performs an act 316 of applying the hashing algorithm to the session identifier associated with the previously established session with the first network function instance 118a. As discussed above, the peer network function 116 may apply the hashing algorithm to the unique session identifier to determine an output (e.g., a numerical output). Based on the value of the output, the peer network function 116 determines one of a plurality of remaining network function instances from a network function set with which to re-establish the session.

As shown in FIG. 3, the peer network function 116 performs an act 318 of re-establishing the session with the second network function instance 118b from the same network function set as the first network function instance 118a. Because the second network function instance 118b is part of the same network function set, the second network function instance 118b has access to session information necessary to re-establish the session with the peer network function 116. Upon re-establishing the session, the peer network function 116 may resume sending communications (e.g., session modify requests) to the second network function instance 118b. The peer network function 116 and the second network function instance 118b may remain engaged throughout a remainder of the session (e.g., so long as the session is active). In the event that the second network function instance 118b goes down, the peer network function 116 may perform a similar procedure to determine an additional network function instance from the network function set with which to resume the session.

While FIGS. 2 and 3 relate to an implementation in which a single peer network function engages with first and second network function instances from a network function set, it will be appreciated that features and functionalities described above in connection with FIGS. 1-3 can similarly apply to a scenario where multiple peer network functions are communicating with instances of a network function set in connection for a similarly identified session (e.g., a session that shares a similar or identical session identifier).

Figure 4:
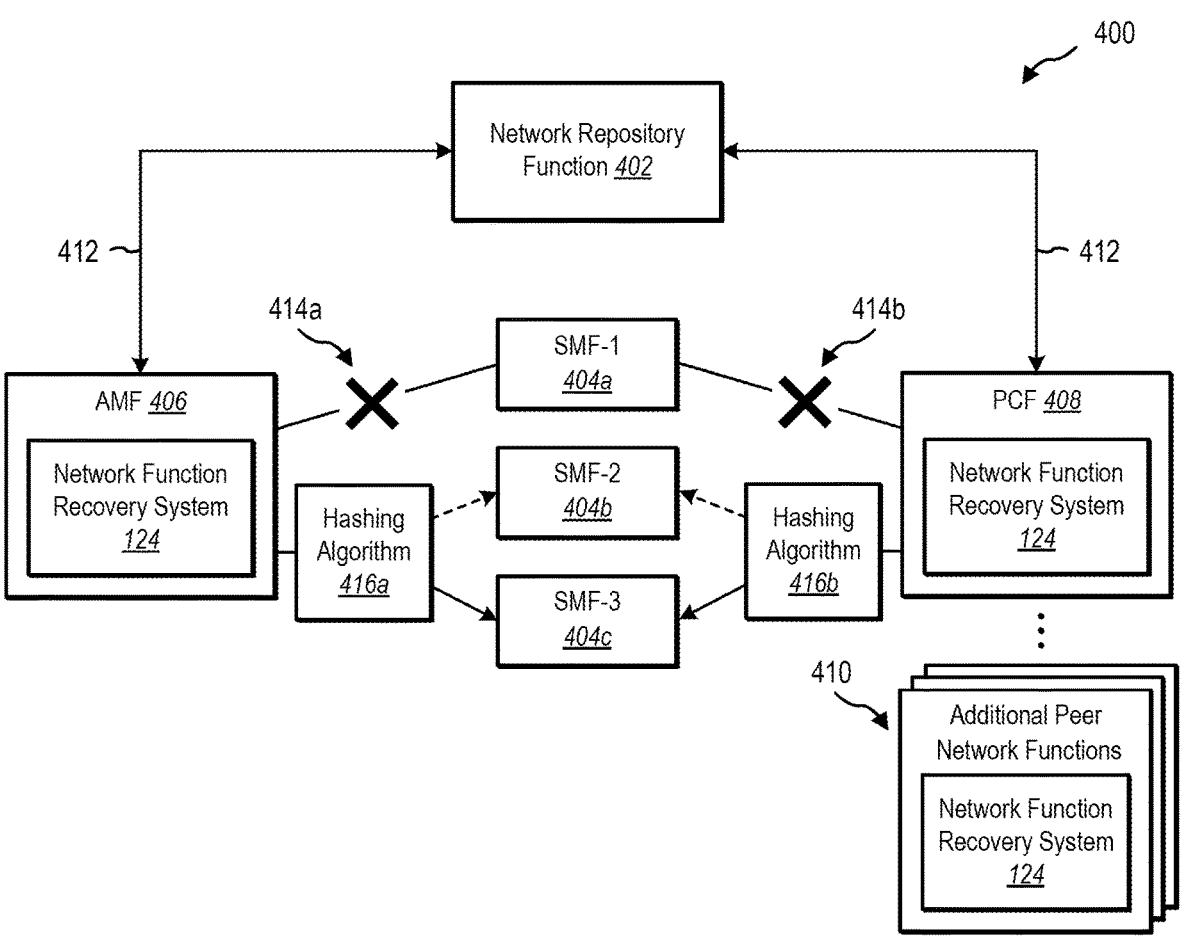
FIG. 4 illustrates an example implementation showing a variety of network function types handling a failure of a session management function (SMF) instance within an SMF set.

FIG. 4 provides an example implementation showing a plurality of different types of peer network functions in communication with a network function instance of a network function set. More specifically, FIG. 4 illustrates an example environment 400 showing a network repository function 402, a plurality of SMF instances 404a-c, and a plurality of different types of peer network functions including, by way of example, an AMF 406, a PCF 408, and additional types of peer network functions 410. As further shown, each of the peer network functions include a network function recovery system 124 implemented thereon having similar features and functionality as previously described implementations of the network function recovery system 124.

It will be noted that the example shown in FIG. 4 is provided by way of example and is not intended to limit embodiments of the present disclosure to specific types of network functions within a specific framework. Thus, while FIG. 4 illustrates an example implementation involving an AMF, PCF, and additional peer network functions in communication with a plurality of SMF instances within a core network of a telecommunications network (e.g., a 5G core network), it will be appreciated that features described in connection with this example are applicable to any communication environment in which peer network functions (e.g., external functions to a network function set) communicate with any number of instances of network functions within a network function set.

Prior to engaging with one another each of the network functions in the environment 400 may register with the network repository function 402 by providing network function profile data to the network repository function 402. As noted above, the profile data includes unique identifiers of each of the network functions as well as a hashing algorithm that enables network functions to locally determine which of a plurality of network function instances should be chosen in re-establishing a session. In one or more embodiments, the network functions provide the profile data to the network repository function 402 prior to engaging in sessions with one another. In one or more embodiments, the network functions provide the profile data as the network functions are configured or otherwise added to the infrastructure of the environment 400. In one or more embodiments, the network repository function 402 selectively stores profile data without storing any information related to the sessions with which any of the network functions are engaged. Thus, the network repository function 402 serves as a repository for profile data, and not as a repository for session information.

Similar to one or more embodiments described above, the AMF 406 includes a network function recovery system 124 that initiates or otherwise engages with a first SMF instance 404a (denoted as SMF-1) from an SMF-type set (e.g., a network function set including a plurality of SMF-type instances). In this example, the AMF 406 and first SMF instance 404a may communicate so long as the session remains active and both the AMF 406 and the first SMF instance 404a remains online and operational.

As shown in FIG. 4, the AMF 406 and the first SMF instance 404a experience a failure condition. In this example, the AMF 406 may attempt to send a session modify request to the first SMF instance 404a, which fails to respond as expected. For example, the AMF 406 may determine that a threshold period of time has passed and determine that the first SMF 404a instance has gone down or is experiencing a down condition that prompts re-establishing the session with another SMF instance. In one or more embodiments, the first SMF instance 404a may locally detect a failure condition and provide a notification to the AMF 406 indicating that the SMF instance 404a is not operating as configured and that future session modify requests should be sent to a different SMF instance from the SMF-type set.

At the same or at a different time, the PCF 408 may similarly detect a failure condition 414b between the PCF 408 and the first SMF instance 404a. In this example, the PCF 408 may discover the failure condition 414b in a similar manner as the AMF 406. Alternatively, the PCF 408 may discover the failure condition in a different manner, such as receiving a notification from the AMF 406 or other network function within the environment 400.

In response to detecting the failure condition, the AMF 406 may perform a hashing algorithm 416a on a session identifier to determine which of the remaining SMF instances 404b-c (denoted as SMF-2 and SMF-3) should be used in re-establishing the session formerly associated with the first SMF instance 404a. In this example, based on applying the hashing algorithm to the session identifier, the AMF 406 determines that the third SMF instance 404c is the SMF instance with which the AMF 406 will re-establish communication for the session.

Using a similar (e.g., identical) profile of the first SMF instance and the same session identifier, the PCF 408 may similarly apply the hashing algorithm 416b to the session identifier to calculate an output. Based on the output (e.g., an identical output as the output determined by the AMF 406), the PCF 408 may re-establish the session formerly associated with the first SMF instance 404a and begin communicating with the third SMF instance 404c. Each of the additional peer network functions 410 may similarly determine that any communications associated with the same session identifier should resume with the third SMF instance 404c.

It will be appreciated that the AMF 406 and the PCF 408 each locally determine to use the same SMF instance as one another based on applying the hashing algorithm from the SMF-1 profile to the same session identifier received or otherwise distributed from the first SMF instance 404a. This same outcome is determined notwithstanding each of the respective peer network functions calculating the hashing algorithm independently. This consistent outcome is additionally achieved without applying local specific policies for selectively determining network function instances from a network function set as is the case with conventional telecommunications networks. Moreover, it will be appreciated that any number of the additional peer network functions 410 would similarly determine to use the same SMF instance based on the hashing algorithm being a part of the first SMF instance profile and based on the same session identifier being distributed between the peer network functions.

It will also be appreciated that the above-description enables the AMF 406, PCF 408, and additional peer network functions 410 to balance the load experienced between the multiple remaining SMF instances 404b-c without a high risk of overloading one of the SMF instances. For example, because each session identifier has a unique value, using the same hashing algorithm to determine one of the remaining SMF instances will not automatically result in all traffic associated with the first SMF instance 404a being offloaded entirely to the second SMF instance 404b or the third SMF instance 404c. Indeed, by associating buckets or ranges with different SMF instances, applying the hashing algorithm to different session identifiers will result in a load balancing effect in which traffic associated with different sessions will be balanced between the remaining SMF instances 404b-c in a manner that reduces one of the remaining SMF instances 404b-c from getting overloaded with additional network traffic.

Turning now to FIG. 5, this figure illustrates an example flowchart including a series of acts for implementing features and functionalities described herein. In particular, FIG. 5 illustrates a series of acts related to one or more peer network functions recovering from a failure of a network function instance from a network function set. While FIG. 5 illustrates acts according to one or more embodiments, alternative embodiments may omit, add to reorder, and/or modify any of the acts shown in FIG. 5. The acts of FIG. 5 may be performed as part of a method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

As shown in FIG. 5, the series of acts 500 includes an act 510 of initiating a session associated with a session identifier (ID) with a first network function instance of a network function set. For example, in one or more implementations, the act 510 involves engaging in a session between a peer network function and a first network function instance of a network function set, the session being associated with a session identifier, wherein the network function set includes a plurality of network function instances.

As further shown, the series of acts 500 includes an act 520 of obtaining a network function profile of the first network function instance that includes a hashing algorithm associated with handling a failure condition. For example, in one or more implementations, the act 520 includes obtaining, from a repository function, a network function profile for the first network function instance, the network function profile including a hashing algorithm associating with handling failure conditions.

As further shown, the series of acts 500 includes an act 530 of determining that the first network function instance has experienced a failure condition. For example, in one or more implementations, the act 530 includes determining, by the peer network function, that the first network function instance has experienced a failure condition.

As further shown, the series of acts 500 includes an act 540 of determining a second network function from the network function set with which to resume the session based on applying the hashing algorithm to the session ID. For example, in one or more implementations, the act 540 includes determining a second network function instance from the plurality of network function instances with which to re-establish the session based on an output of applying the hashing algorithm to the session identifier.

In one or more embodiments, the series of acts 500 includes an act of re-establishing the session with the second network function based on determining the second network function instance from the network function set. In one or more embodiments, the session identifier is assigned to the session such that when applying the hashing algorithm to the session identifier and one or more additional session identifiers associated with the first network function instance results in a load-balanced distribution of network traffic associated with a plurality of session identifiers between additional network function instances from the plurality of network function instances.

In one or more embodiments, the plurality of network function instances that make up the network function set includes the first network function instance, the second network function instance, and at least one additional network function instances. In one or more embodiments, the peer network function and the plurality of network function instances are network functions on a core network of the telecommunications network being hosted by a cloud computing system.

In one or more embodiments, the plurality of network function instances are session management function (SMF) instances from a set of associated network function instances, the set of associated network function instances having access to session information associated with the session identifier. In one or more embodiments, the peer network function is one of an access and mobility management function (AMF), a policy control function (PCF), a charging function (CHF), or a user plane function (UPF).

In one or more embodiments, the network function profile is distributed to the peer network function when the session is initiated between the peer network function and the first network function instance from the network function set. In one or more embodiments, the network function profile is obtained by the peer network function based on determining that the first network function instance has experienced a failure condition. In one or more embodiments, the telecommunications network is a 5G mobile network where the peer network function and the plurality of network function instances are implemented within a core network of the 5G mobile network.

Figure 6:
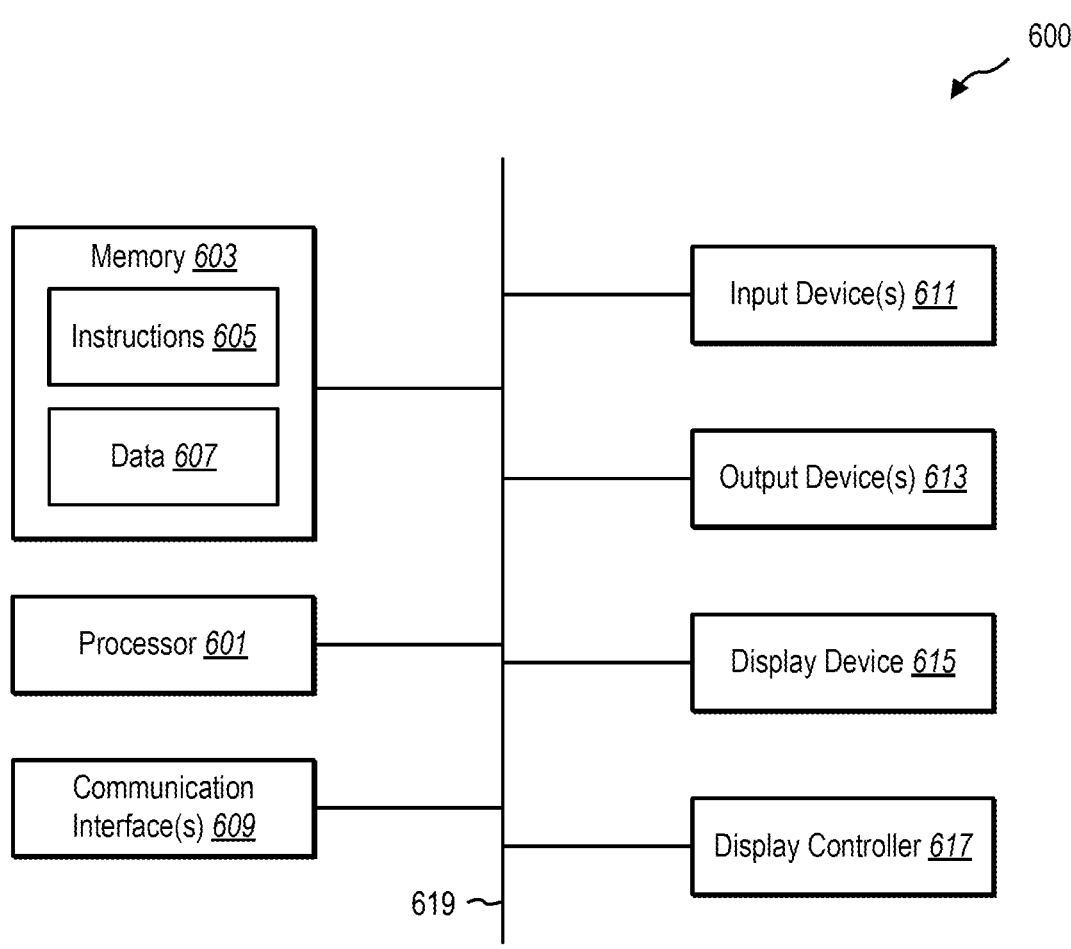
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a telecommunications network including a peer network function in communication with one or more network function instances of a network function set, a method for handling failure conditions of the one or more network function instances, the method comprising:

engaging in a session between a peer network function and a first network function instance of a network function set, the session being associated with a session identifier, wherein the network function set includes a plurality of network function instances of a similar network function type that share access to session information;

obtaining, from a repository function, a network function profile for the first network function instance, the network function profile including a hashing algorithm associated with determining a network function instance from the plurality of network function instances with which to re-establish the session in the event that the first network function experiences a failure condition;

determining, by the peer network function, that the first network function instance has experienced a failure condition;

assigning ranges of values to corresponding network function instances from the plurality of network function instances;

applying, by the peer network function, the hashing algorithm from the network function profile to determine an output having a value associated with a second network function instance from the network function set wherein determining the second network function instance from the plurality of network function instances is based on the value of the output falling within a range of values from the ranges of values associated with the second network function instance; and determining the second network function instance from the plurality of network function instances of the network function set with which to re-establish the session based on the output of applying the hashing algorithm to the session identifier.

2. The method of claim 1, further comprising re-establishing the session with the second network function based on determining the second network function instance from the network function set.

3. The method of claim 1, wherein the session identifier is assigned to the session such that when applying the hashing algorithm to the session identifier and one or more additional session identifiers associated with the first network function instance results in a load-balanced distribution of network traffic associated with a plurality of session identifiers between additional network function instances from the plurality of network function instances.

4. The method of claim 1, wherein the plurality of network function instances are session management function (SMF) instances from a set of SMF instances, the set of SMF instances having access to session information associated with the session identifier.

5. The method of claim 4, wherein the peer network function is one of an access and mobility management function (AMF), a policy control function (PCF), a charging function (CHF), or a user plane function (UPF).

6. The method of claim 1, wherein the network function profile is distributed to the peer network function when the session is initiated between the peer network function and the first network function instance from the network function set.

7. The method of claim 1, wherein the network function profile is obtained by the peer network function based on determining that the first network function instance has experienced a failure condition.

8. The method of claim 1, wherein the telecommunications network is a 5G mobile network, and wherein the peer network function and the plurality of network function instances are implemented within a core network of the 5G mobile network.

9. The method of claim 1, further comprising applying the hashing algorithm to the session identifier to determine a value associated with the second network function instance from the network function set, wherein determining the second network function from the plurality of network function instances is based on the determined value from applying the hashing algorithm to the session identifier.

10. In a telecommunications network including a peer network function in communication with one or more network function instances of a network function set, a system for handling failure conditions of a network function instance, the system comprising:

at least one processor;

memory in electronic communication with the at least one processor; and instructions stored in the memory, the instructions being executable by the at least one processor to:

engage in a session between a peer network function and a first network function instance of a network function set, the session being associated with a session identifier and the network function set including a plurality of network function instances of a similar network function type that share access to session information;

obtain, from a repository function, a network function profile for the first network function instance, the network function profile including a hashing algorithm associated with determining a network function instance from the plurality of network function instances with which to re-establish the session in the event that the first network function experiences a failure condition;

determine, by the peer network function, that the first network function instance has experienced a failure condition;

assign ranges of values to corresponding network function instances from the plurality of network function instances;

applying, by the peer network function, the hashing algorithm from the network function profile to determine an output having a value associated with a second network function instance from the network function set, wherein determining the second network function instance from the plurality of network function instances is based on the value of the output falling within a range of values from the ranges of values associated with the second network function instance; and determine the second network function instance from the plurality of network function instances of the network function set with which to re-establish the session based on the output of applying the hashing algorithm to the session identifier.

11. The system of claim 10, further comprising instructions being executable by the at least one processor to re-establish the session with the second network function based on determining the second network function instance from the network function set.

12. The system of claim 10, wherein the session identifier is assigned to the session such that when applying the hashing algorithm to the session identifier and one or more additional session identifiers associated with the first network function instance results in a load-balanced distribution of network traffic associated with a plurality of session identifiers between additional network function instances from the plurality of network function instances.

13. The system of claim 10, wherein the plurality of network function instances that make up the network function set includes the first network function instance, the second network function instance, and at least one additional network function instances.

14. The system of claim 10, wherein the plurality of network function instances are session management function (SMF) instances from a set of SMF instances, the set of SMF instances having access to session information associated with the session identifier.

15. The system of claim 14, wherein the peer network function is one of an access and mobility management function (AMF), a policy control function (PCF), a charging function (CHF), or a user plane function (UPF).

16. The system of claim 10, wherein the network function profile is:

distributed to the peer network function when the session is initiated between the peer network function and the first network function instance from the network function set; or obtained by the peer network function based on determining that the first network function instance has experienced a failure condition.

17. The system of claim 10, wherein the telecommunications network is a fifth generation (5G) mobile network, and wherein the peer network function and the plurality of network function instances are implemented within a core network of the 5G mobile network.

18. In a 5G mobile network including a plurality of peer network functions in communication with one or more network function instances from a network function set, a method for handling failure conditions of the one or more network function instances, the method comprising:

engaging in a session between a first peer network function from the plurality of peer network functions and a first network function instance of a network function set, the session being associated with a session identifier, wherein the network function set includes a plurality of network function instances of a similar network function type that share access to session information;

obtaining, from a repository function, a network function profile for the first network function instance, the network function profile including a hashing algorithm associated with determining a network function instance from the plurality of network function instances with which to re-establish the session in the event that the first network function experiences a failure condition, wherein the network function profile is distributed to any of the peer network functions from the plurality of peer network functions engaged in the session with the first network function instance;

determining, by the peer network function, that the first network function instance has experienced a failure condition;

assigning ranges of values to corresponding network function instances from the plurality of network function instances;

applying, by the peer network function, the hashing algorithm from the network function profile to determine an output having a value associated with a second network function instance from the network function set, wherein determining the second network function instance from the plurality of network function instances is based on the value of the output falling within a range of values from the ranges of values associated with the second network function instance; and determining the second network function instance from the plurality of network function instances of the network function set with which to re-establish the session based on the output of applying the hashing algorithm to the session identifier.

19. The method of claim 18, wherein the session identifier is assigned to the session such that when applying the hashing algorithm to the session identifier and one or more additional session identifiers associated with the first network function instance results in a load-balanced distribution of network traffic associated with a plurality of session identifiers between additional network function instances from the plurality of network function instances.

* * * * *